United States Patent [19]

Cochran et al.

[11] 4,125,830

[45] Nov. 14, 1978

[54] ALPHANUMERIC DISPLAY SYSTEM

[75] Inventors: Michael J. Cochran, Richardson; Stephen P. Hamilton, Garland, both of Tex.

[73] Assignee: Texas Instruments Incorporated, Dallas, Tex.

[21] Appl. No.: 658,793

[22] Filed: Feb. 17, 1976

Related U.S. Application Data

[63] Continuation-in-part of Ser. No. 439,474, Feb. 2, 1974, abandoned, which is a continuation-in-part of Ser. No. 428,492, Dec. 26, 1973, Pat. No. 4,020,465.

[51] Int. Cl.[2] .......... G06K 15/18

[52] U.S. Cl. .......... 340/336; 340/337

[58] Field of Search .......... 340/334, 336, 324 M

[56] References Cited

U.S. PATENT DOCUMENTS

| | | | |
|---|---|---|---|
| 3,715,744 | 2/1973 | Ito et al. | 340/336 |
| 3,781,852 | 12/1973 | White et al. | 340/336 |
| 3,793,629 | 2/1974 | Sharpless | 340/324 M |
| 3,879,723 | 4/1975 | Hornung | 340/336 |

*Primary Examiner*—David L. Trapton

*Attorney, Agent, or Firm*—Rene' E. Grossman; Richard P. Berg

[57] ABSTRACT

An alphanumeric display system which may be implemented on one or more semiconductor chips for controlling display devices arrayed in N groups, each group of which comprises an A by B matrix of devices and which is capable of displaying a single alphanumeric character. The display devices in each group are sequentially addressed with display commands being communicated therewith in a predetermined manner to cause the display devices to visually display a predetermined alphanumeric character. Use of the alphanumeric display system herein disclosed, permits a total of A by B by N display devices to be controlled by the display system using as few as A + B + N connecting conductors to control the display devices and associated display driver devices.

23 Claims, 16 Drawing Figures

ALPHANUMERIC DISPLAY SYSTEM

This application is a continuation-in-part of application Ser. No. 439,474, "Strobed Alphanumeric Display System", filed Feb. 2, 1974, now abandoned, which was a continuation-in-part of copending application Ser. No. 428,492, "Thermal Line Printer", filed Dec. 26, 1973, now U.S. Pat. No. 4,020,465, which issued Apr. 26, 1977. U.S. Pat. No 4,020,465 discloses an alphanumeric display system for use with a printer. This application discloses an alphanumeric display system for use with a visual display, such as, for example, an array of light emitting diodes.

This invention relates to displays in general and more particularly to alphanumeric display systems having circuit elements implementable on one or more semiconductor chips. The circuit is implementable on a single chip due to the fact that it utilizes a small number of conductors to control the display devices and associated display drivers. The circuit receives alphanumeric data and function signals for display purposes and control signals from calculator or microprocessor circuits, which circuits can be implemented on the same or different semiconductor chip or chips.

Electronic desk-top calculators, compact hand-held calculators, and small size microprocessors are now readily available at low cost primarily because of advances in semiconductor technology. Availability of MOS/LSI chips has permitted the development of desk-top and hand-held calculators and microprocessors of capabilities far beyond those of the previous calculator and microprocessor generations.

In U.S. Pat. No. 3,984,816, which issued Oct. 5, 1976 to Michael J. Cochran et al and which is assigned to the assignee of this invention a two chip calculator is disclosed in detail wherein there is provided a numeric display of the calculator results and function signals. A one chip calculator is described in detail in application Ser. No. 163,565, "Variable Function Program Calculator", filed July 16, 1971 by M. J. Cochran et al, now abandoned in favor of continuation application Ser. No. 420,999 filed Dec. 3, 1973 and now abandoned. Such calculators are currently manufactured and sold by Texas Instruments Incorporated.

The present invention discloses a display system which utilizes function and data signals from units such as those embodied in the above-mentioned Texas Instruments calculators along with control and timing to provide an alphanumeric display using a small number of conductors interconnecting the circuit with display devices and associated display driver devices.

Illustrations of prior art alphanumeric display systems are the systems disclosed in U.S. Pat. Nos. 3,476,877 and 3,787,834. U.S. Pat. No. 3,476,877 discloses a thermal printer system of the type utilizing strobed thermal printhead elements to provide alphanumeric characters. Such a printer, however, features a clocking arrangement requiring external clock signals and requires new data to be input for every line of dots outputted, thereby requiring several data inputs to the system per printed line of complete characters. Furthermore, the data input of such prior art systems must be in a coded format which directly actuates the respective dots in the output.

U.S. Pat. No. 3,787,834 discloses a visual alphanumeric display system. This system features nonmultiplexed outputs to the display devices, thereby requiring 40 × 18 + 1 (721) conductors from the system to a display comprising 40 characters each having 18 segments. Considering modern packaging techniques, such a large number of conductors cannot be implemented on a single, or even a small number of semiconductor chips.

It is an object of the present invention to provide a display system utilizing storage means for storing character codes especially in a calculator or microprocessor system.

It is another object of this invention to control an array of display elements using a small number of conductors connected to the display elements and associated drivers such that standard packaging techniques may be used to package a semiconductor chip implementing the system circuit.

It is another object to provide a display system for outputting and a line of N characters, each character being generated by actuation of an A by B matrix in accordance with a character code selected from a read only character storage memory.

It is yet another object to provide such a display system which is responsive to input data which is selectively decoded and stored in a memory for addressing the character storage memory.

It is still another object to provide such a display system which utilizes a stored plurality of codes to decode data representing alphanumeric function signals in addition to displaying alphanumeric data.

It is still yet another object to provide such a display system which simultaneously addresses like-positioned diodes in each character matrix of a multimatrix VLED causing predetermined addressed diodes to light in accordance with stored codes representing predetermined alphanumeric characters and which system then sequentially addresses in a similar manner all the remaining diodes in each character matrix.

In accordance with the present invention, a display chip implementing the circuit is operated to generate its own clock signal, which is slaved to the clock in the calculator or microprocessor circuits. A data stream and display command in combination with a character storage memory are utilized for selective energization of N groups of display devices, each disposed in A by B array.

More particularly, an alphanumeric display system circuit, which may be implemented on a semiconductor chip, is provided for an alphanumeric display where A by B by N dots are provided in an array of N character matrices each comprising an A by B matrix. The A by B matrix elements are addressed sequentially and all like-positioned elements in the N matrices are addressed in unison. A Sequential Access Memory (SAM) stores N multibit words, one word for each character to be displayed according to the data stream and display commands supplied to the circuit. A commutator cyclically reads these N stored words from the SAM; this display cycle being repeated, e.g. the N words are reread, each time like-positioned elements in the N matrices are addressed. The words read from the SAM are decoded by a random access character storage Read-Only-Memory (ROM), in which an A by B matrix code is stored for each displayable alphanumeric character. A shift register then stores a selected bit from each decoded word; the position of bit selected from the decoded word corresponds to the position of like-positioned matrix elements addressed during each display cycle.

All the like-positioned matrix elements are addressed in unison. Whether a particular addressed element is actuated to give a visual display depends on the logic level of the shift register location associated with the character matrix in which the particular addressed element is located. If a particular element is to give a visual display, the shift register transmits an enable signal to the driver device associated with each matrix. The display cycle occurs with sufficient rapidity to cause each character displayed to appear to the human eye to be constantly actuated.

A set of timing signals is generated and synchronized with the storage of the N words. A sequencer monitors the timing signals and generates signals for addressing the matrix elements and for selecting which bit from every decoded word is read into the shift register during each display cycle.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, wherein:

Figure 1:
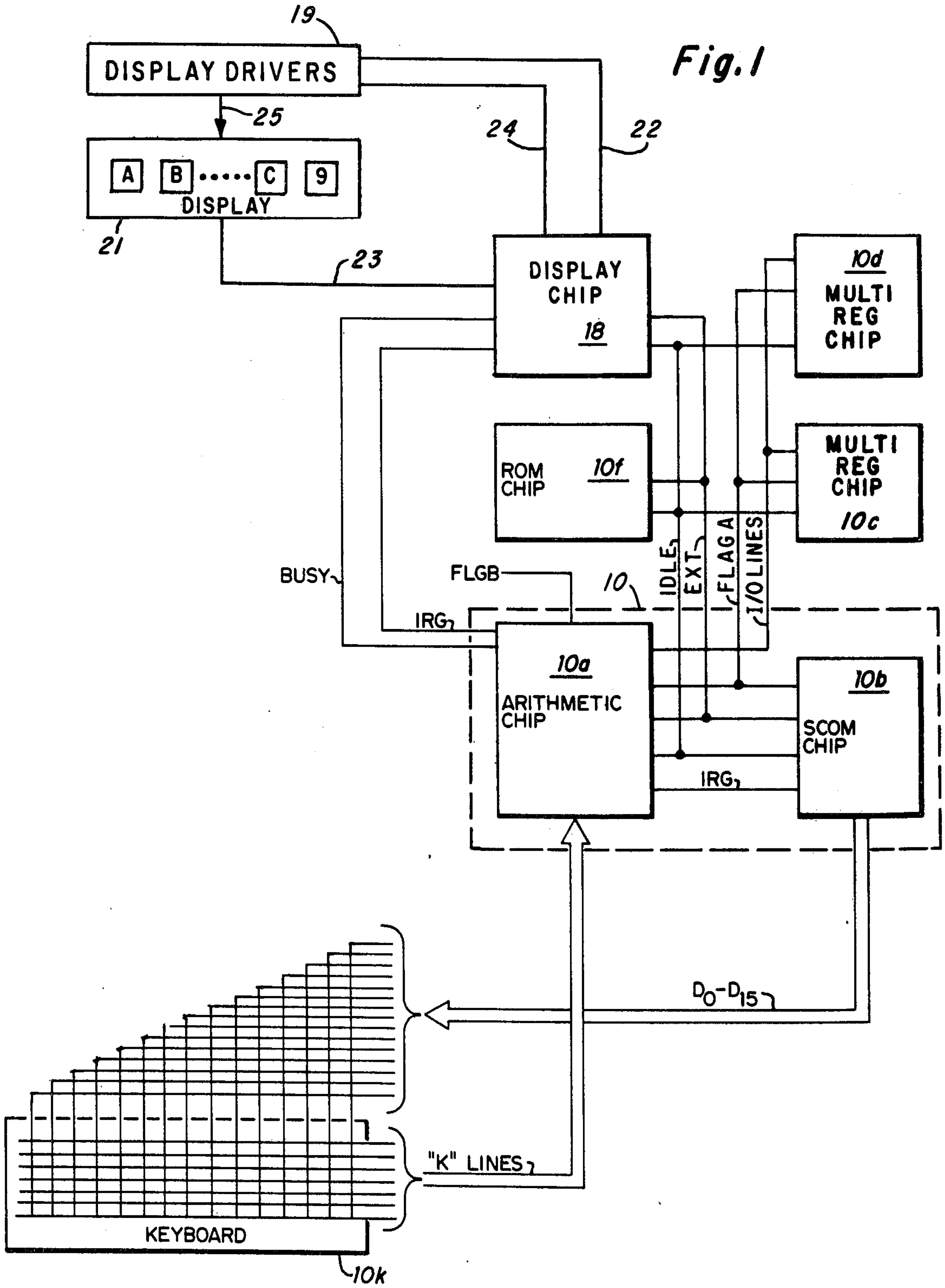
FIG. 1 is a simplified block diagram of a calculator system illustrating application of one aspect of the invention.
Figure 13:
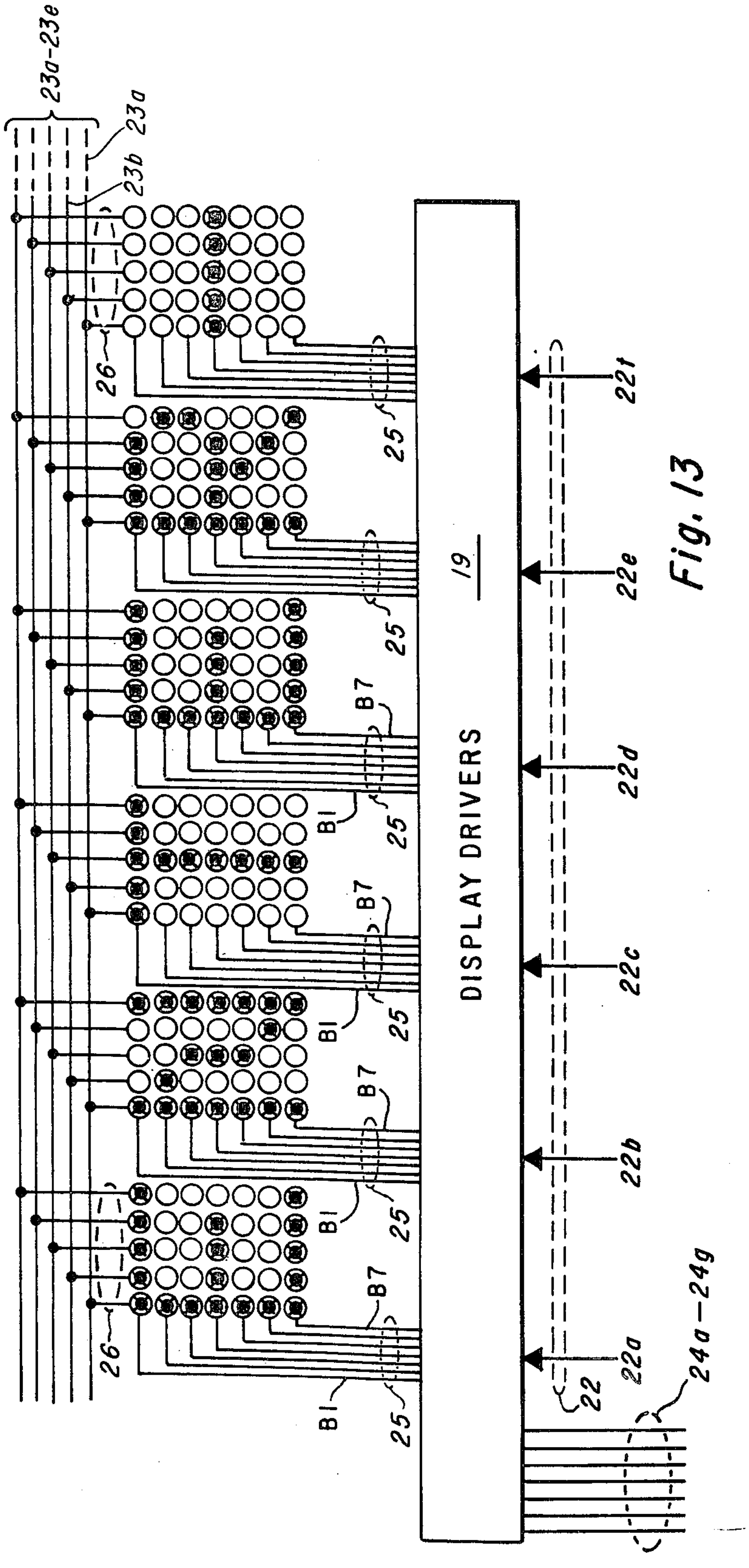
Figure 14A:
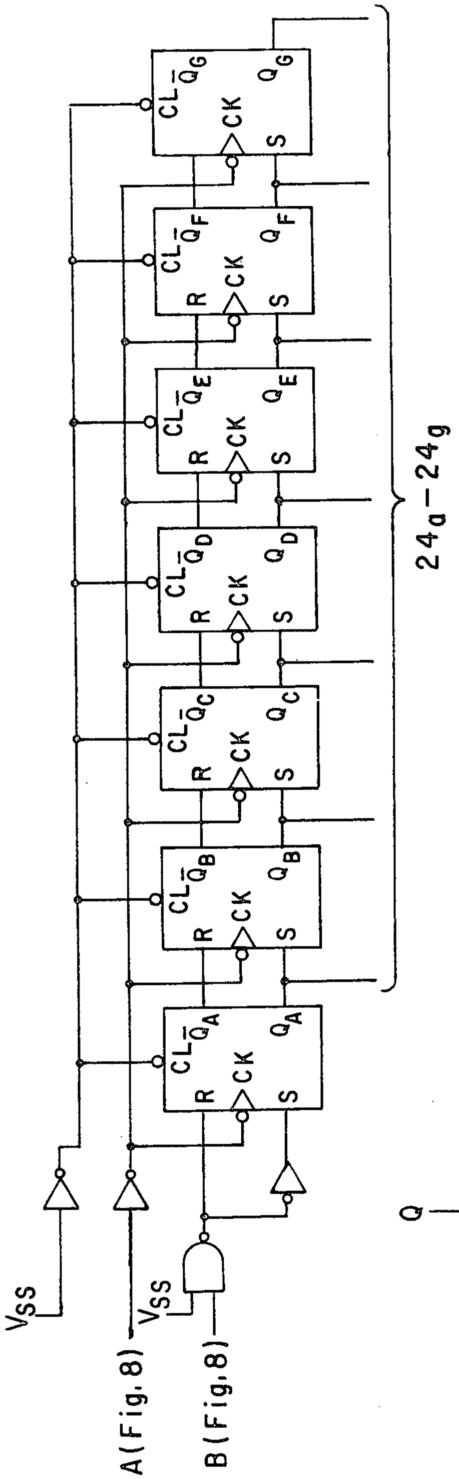
Figure 14B:
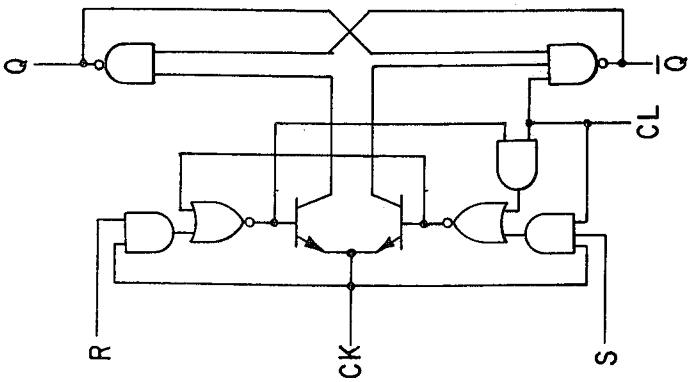

FIGS. 3*a*-12 comprise a schematic diagram of one embodiment of the calculator chip of FIG. 1;

FIG. 13 depicts a matrix type display used in accordance with this invention; and FIG. 14*a* depicts a shift register used in conjunction with the schematic depicted in FIGS. 3*a*-12. FIG. 14*b* is a flip-flop thereof.

FIG. 1 illustrates in functional block diagram form a multichip calculator 10 in which the present invention may be employed.

Calculator 10 of FIG. 1 is described in detail in U.S. Pat. No. 3,916,169 granted to Michael J. Cochran et al on Oct. 28, 1975. Briefly, calculator 10 includes an arithmetic chip 10*a* and a SCOM (Scanning and Read-Only-Memory) chip 10*b* interconnected with a display chip 18. Chip 18 is connected to a matrix type display 21 by bus 23 and connected to display drivers 19 by buses 22 and 24.

In addition, the following auxiliary chips are included: Multiregister chips 10*c* and 10*d*; and a ROM chip 10*f*.

The output of SCOM chip 10*b* is connected by way of D lines to a keyboard 10*k*. A set of K lines connect the output of keyboard 10*k* to arithmetic chip 10*a*.

The present invention is principally directed to an alphanumeric display system, which may be implemented in a single display chip 18, in combination with a display 21 and display drivers 19. Display chip 18 provides a system operable to display at the display 21 data employed in and provided by calculator 10.

The heart of calculator 10, as described in the above-identified U.S. Pat. No. 3,916,169, is comprised of the arithmetic chip 10*a* and the SCOM chip 10*b*. Arithmetic chip 10*a* generates a plurality of control signals which are applied: (a) to SCOM chip 10*b*; (b) to an external Read-Only-Memory (ROM) chip 10*f*; (c) to the external multiregister chips 10*c* and 10*d* which provide external data word storage; and (e) to display chip 18 to provide for controlling an output display of the strobed matrix type.

While the above-identified U.S. Pat. No. 3,916,169 describes calculator 10 in detail, briefly, the control signals generated by the arithmetic chip 10*a* include the following:

EXTERNAL (EXT) indicates that the arithmetic chip is addressing SCOM storage and indicates which ROM storage (constant or programmed) is being addressed, and further communicates in multiplexed bit fashion HOLD and COND control signals. With particular reference to the operation of the display chip 18, the EXT leads from a multibit register in calculator 10. The first three bits of the output from such register address particular auxiliary units of calculator 10 with which communication is desired. Output through EXT is communicated to the display chip 18. The data portion of each word employed by display chip 18 comprises bits 4–10. Thus, data continuously flows through EXT and is received by chip 18 but is used only in response to a particular command given to chip 18, which command selects and permits utilization of bits 4–10 only;

A HOLD bit in EXT indicates that an interrupt is desired in the normal sequencing of a ROM in the SCOM 106 to allow additional executions by the system before the next instruction word is to be executed;

A CONDITION (COND) bit in EXT indicates that a condition latch has been set indicating status of a particular flag or the results of a comparison of flags;

IDLE ($\overline{IDLE}$) synchronizes chip 18 and all other chips. It is a control signal indicative of the idle condition of the chip 10*a*, i.e., whether chip 10*a* is actually in the calculating mode (non-idle) or in the display or scanning mode (idle), and provides synchronization of the timing generators of SCOM 10*b* to the timing generators of chip 10*a*;

FLAG A (FLGA) is a serial output of a Flag A register in a Sequential Address Memory (SAM) in chip 10*a* at an output rate determined by COND;

FLAG B (FLGB) is a serial output of a Flag B register in the SAM of chip 10*a* or is the B1 or first bit of a B register output;

DISPLAY TIME (D TIME) comprises timed signals each occupying an instruction cycle of sixteen State (S) times duration, wherein the D times are generated in cycles of sixteen so that D times precess from the particular D time of the preceding cycle;

KEYBOARD INPUTS (K LINES) are signals from the keyboard for entering enternally commands to the arithmetic chip;

INSTRUCTION WORDS (IRG) indicate the particular instruction word comprising thirteen bits ($I_0$-$I_{12}$) stored in a particular SCOM memory storage unit;

BUSY (BUSY) represents the condition of the peripheral display chip. For example, the display chip 18 may signal that it is not/is busy and can/cannot then receive another command on IRG for displaying;

INPUT/OUTPUT (I/O) are data lines conveying data bits from any of the various data registers and memories located in the arithmetic chip 10*a*, SCOM chip 10*b*, and multiregister chips 10*c* and 10*d*.

SCOM chip 10*b* provides the D times for selectively scanning in sequence the keyboard 10*k*. SCOM chip 10*b* is responsive to EXT and $\overline{IDLE}$ command signals from the arithmetic chip and generates in response thereto the D times, the instruction word $I_0$-$I_{12}$, IRG and data from a constant ROM, all of which is communicated back to arithmetic chip 10*a*.

ROM chip 10*f* may be one of an expandable set of peripheral chips allowing expanded calculator capacity. ROM chip 10*f* is responsive to the EXT and $\overline{\text{IDLE}}$ commands from the arithmetic chip for providing a 1024 additional instruction word capacity per additional ROM chip.

Multiregister chips 10*c* and 10*d* are of a set of peripheral chips providing expanded data storage capacity to calculator 10. The multiregister chips 10*c* and 10*d* are responsive to Flag A, $\overline{\text{IDLE}}$, and I/O information from the arithmetic chip 10*a* for providing recall data through the I/O lines in return to the arithmetic chip.

The display chip 18 is responsive to EXT and $\overline{\text{IDLE}}$ commands from the arithmetic chip.

Both SCOM and arithmetic chips include separate timing generators for providing S and D times, with the timing generator on the SCOM chip dependent upon the arithmetic chip for synchronization. The two-chip system disclosed in U.S. Pat. No. 3,916,169 features a multiplexed command signal from the arithmetic chip to the SCOM chip wherein each bit of a subset of bits in the command word represents the particular condition required to be transmitted. For example, the EXT signal communicated to the SCOM chip transmits a PREG, Program Register, signal in the $X_0$ bit indicating that the SCOM chip is being addressed, transmits a second signal in the second bit at time $S_1$ for indicating the COND condition, and transmits the HOLD condition in the third bit at time $S_2$ indicating that the ROM address register is not to be incremented.

Figure 2:
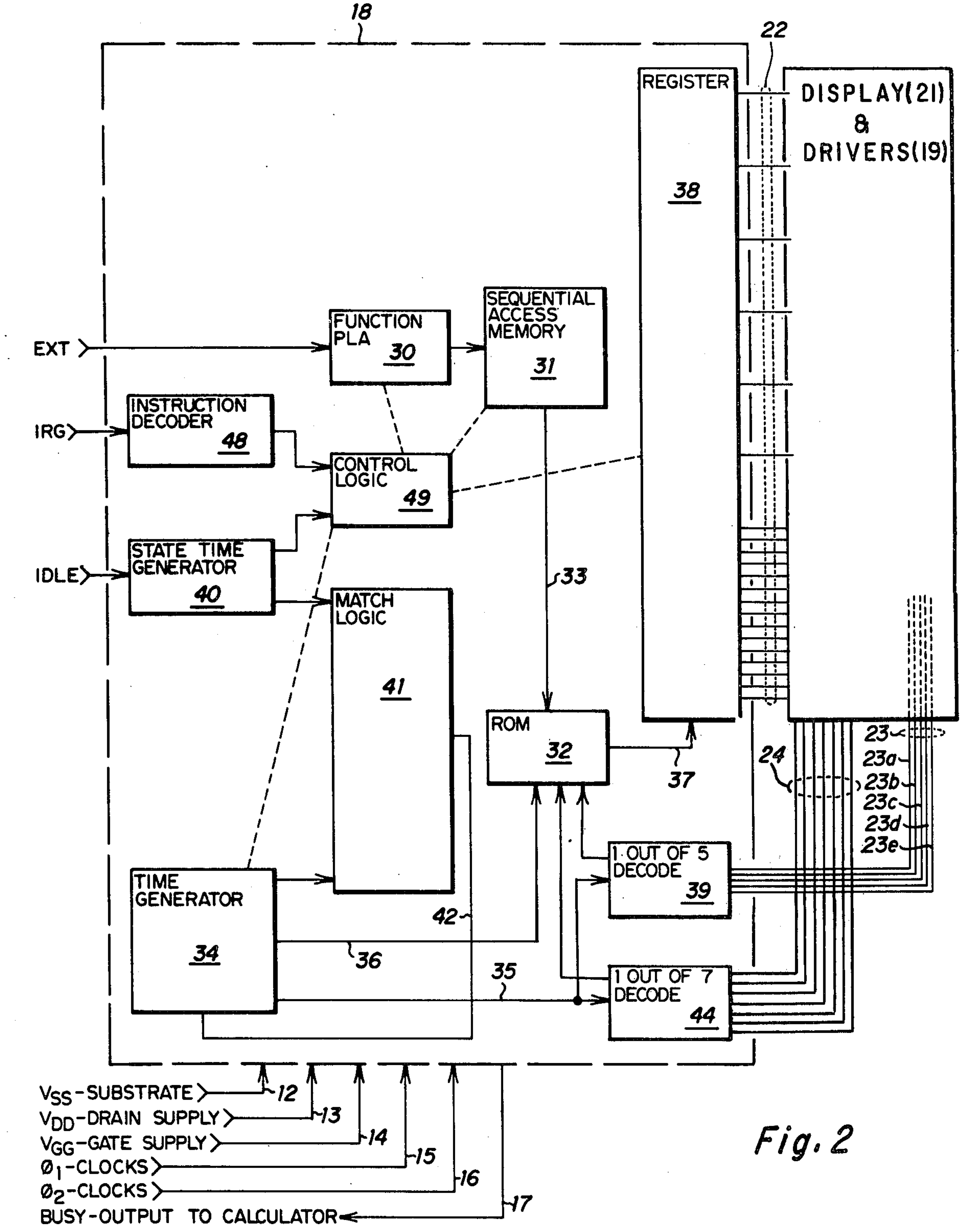
FIG. 2 is a block diagram of a printer depicting another embodiment of the invention.
Figure 3A:
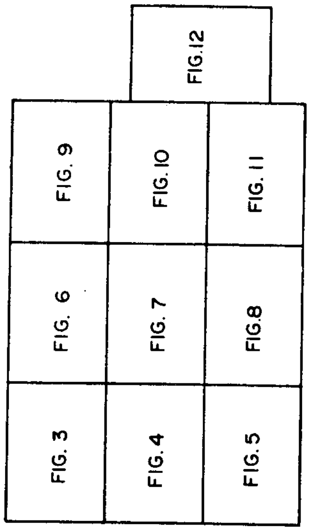
Figure 3B:
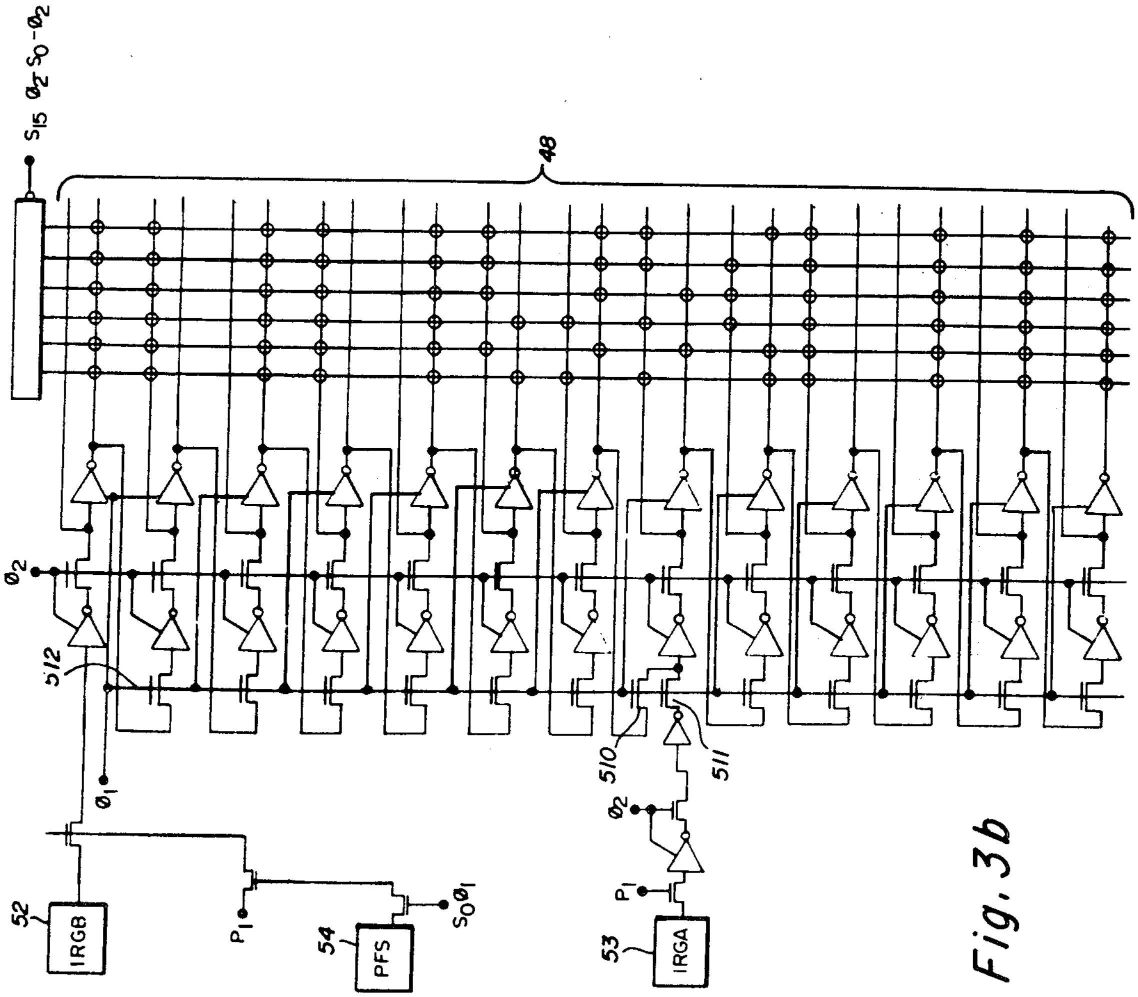
Figure 4:
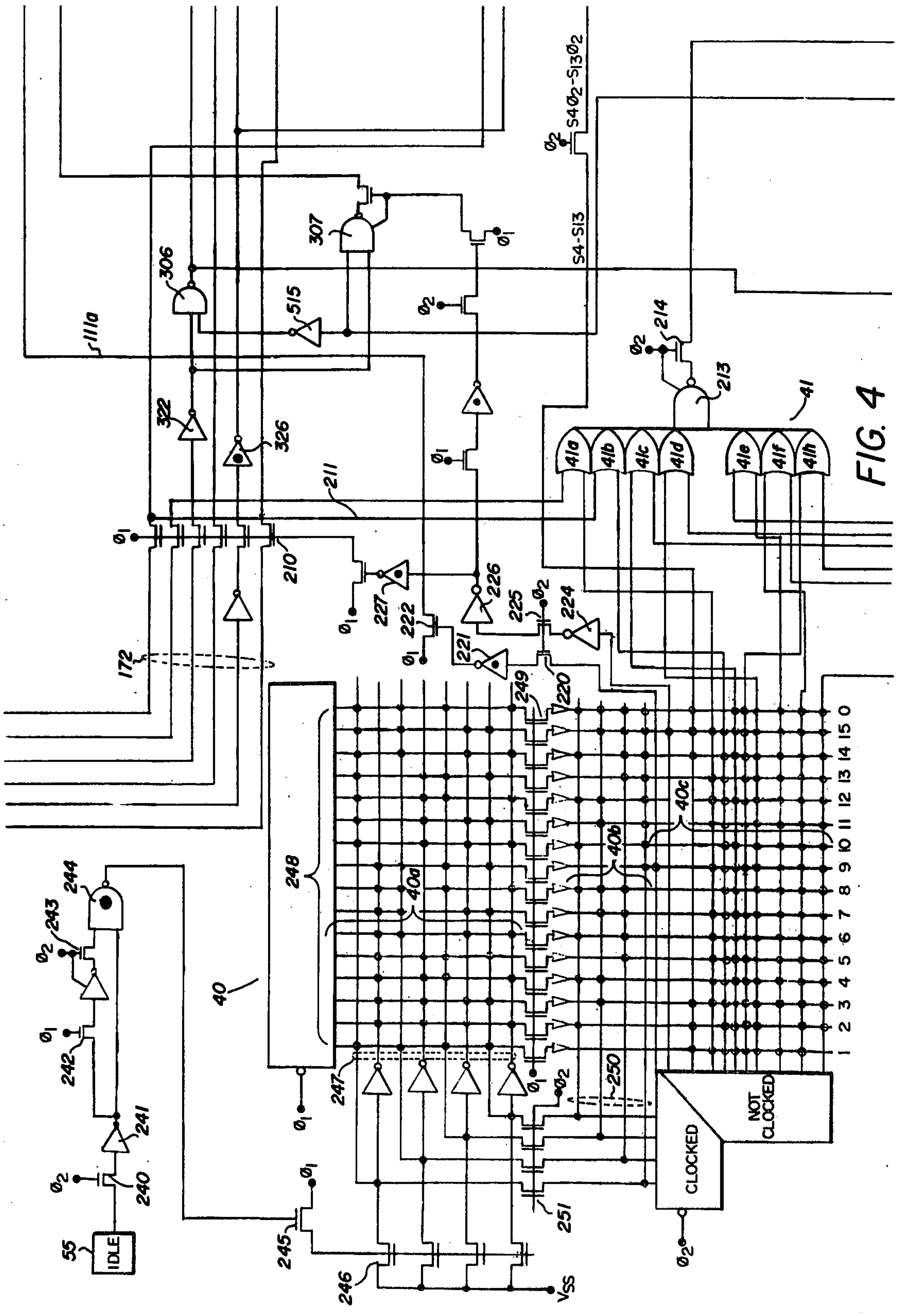
Figure 5:
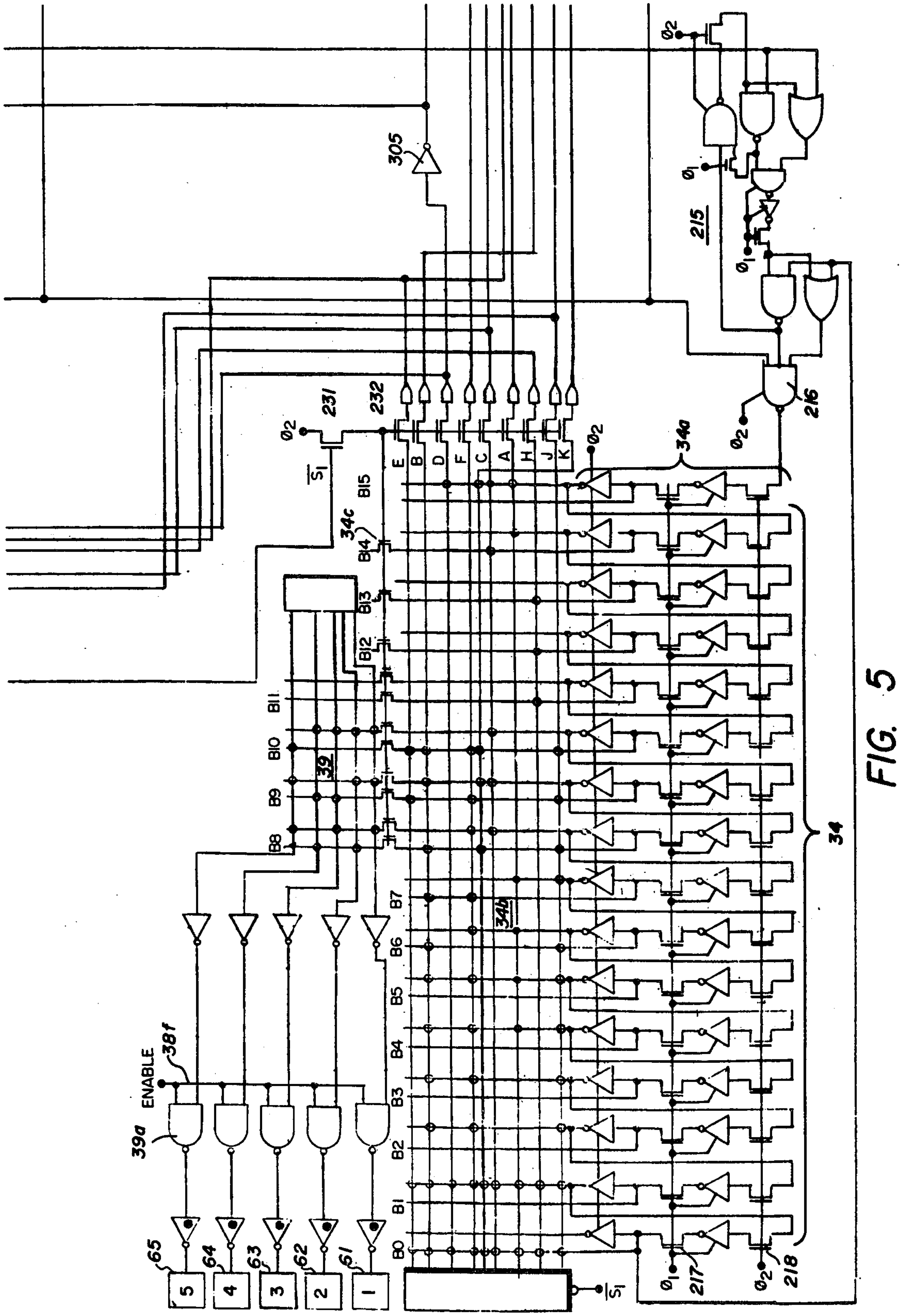
Figure 6:
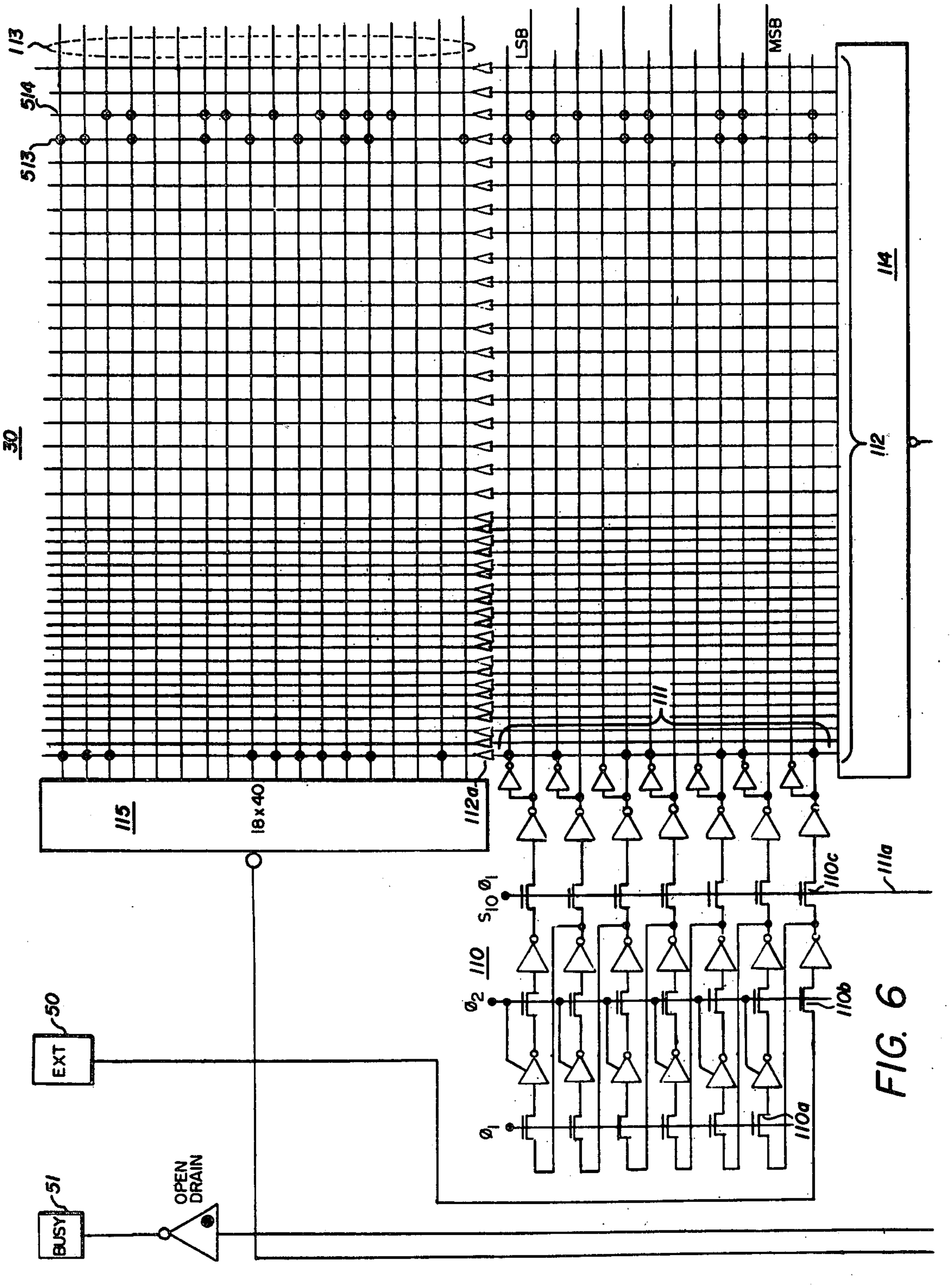
Figure 7:
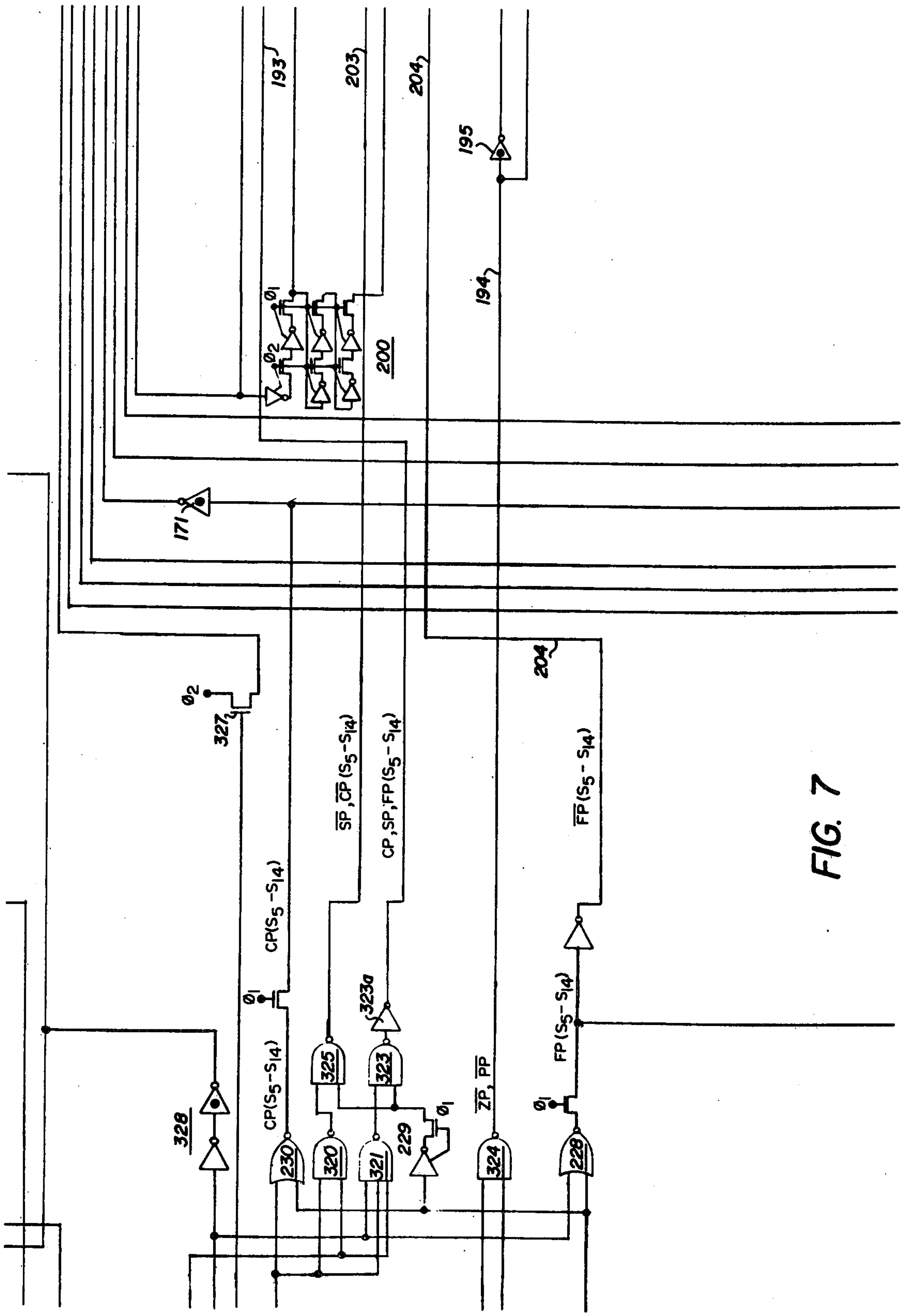
Figure 8:
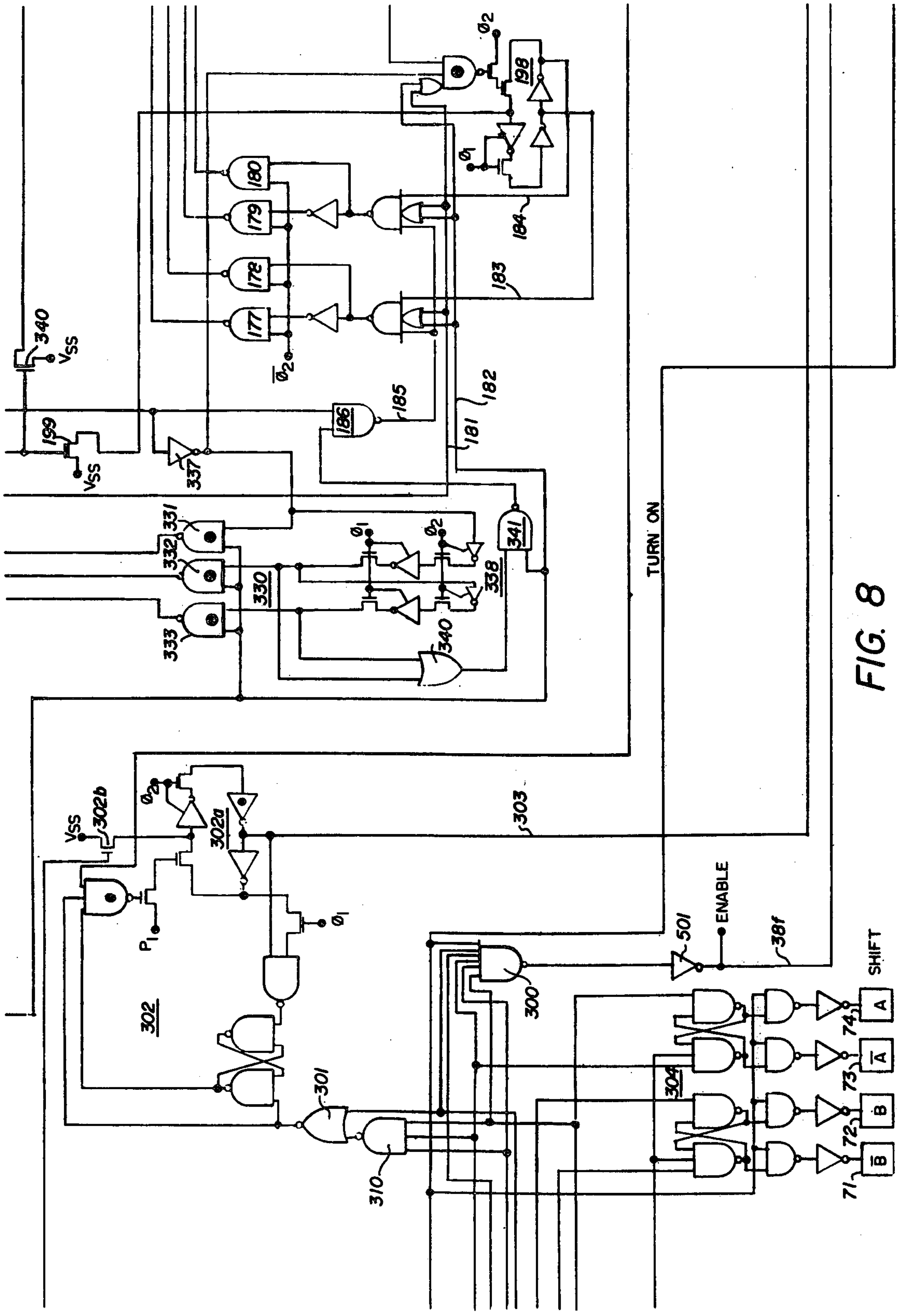
Figure 9:
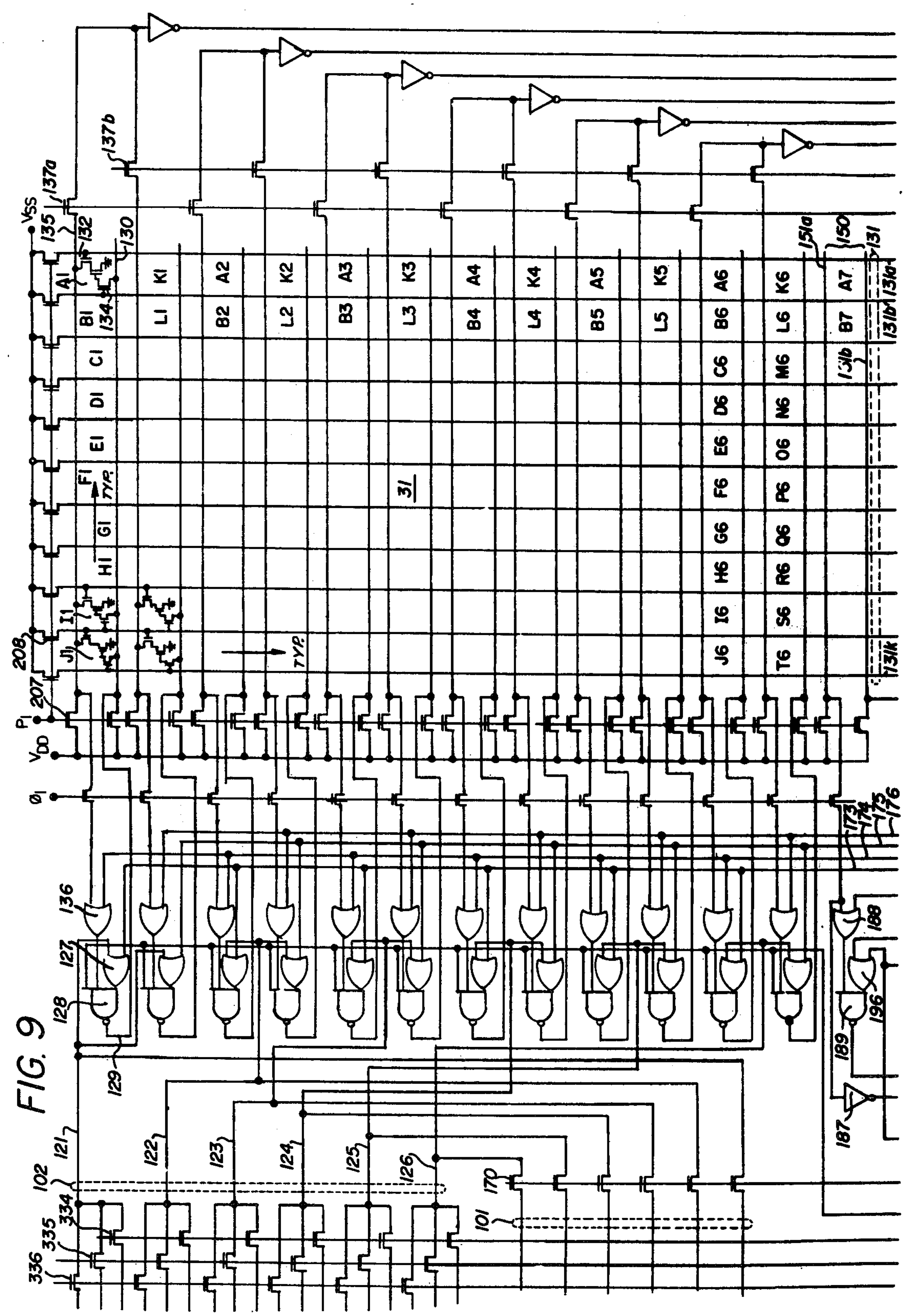
Figure 10:
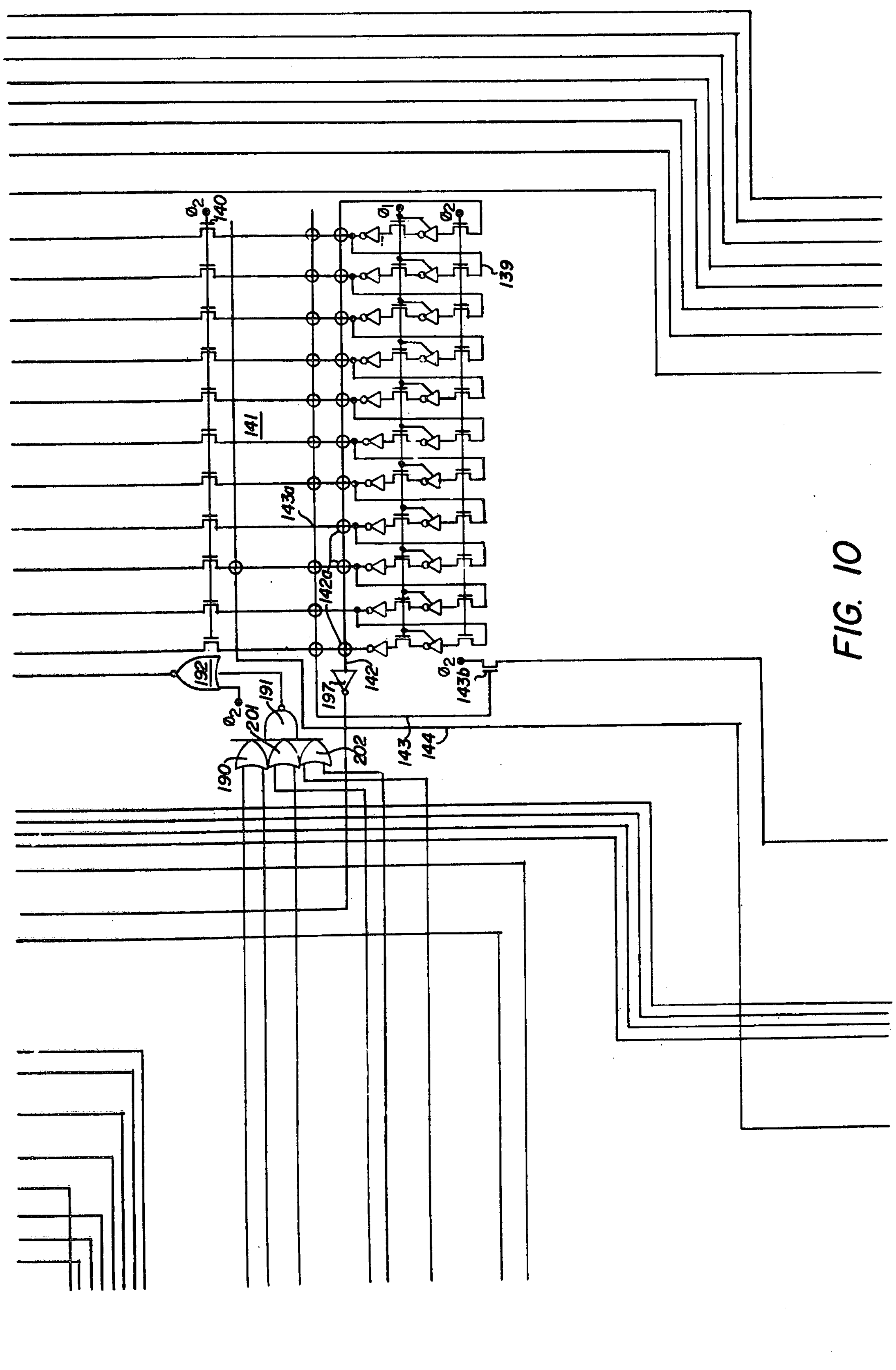
Figure 11:
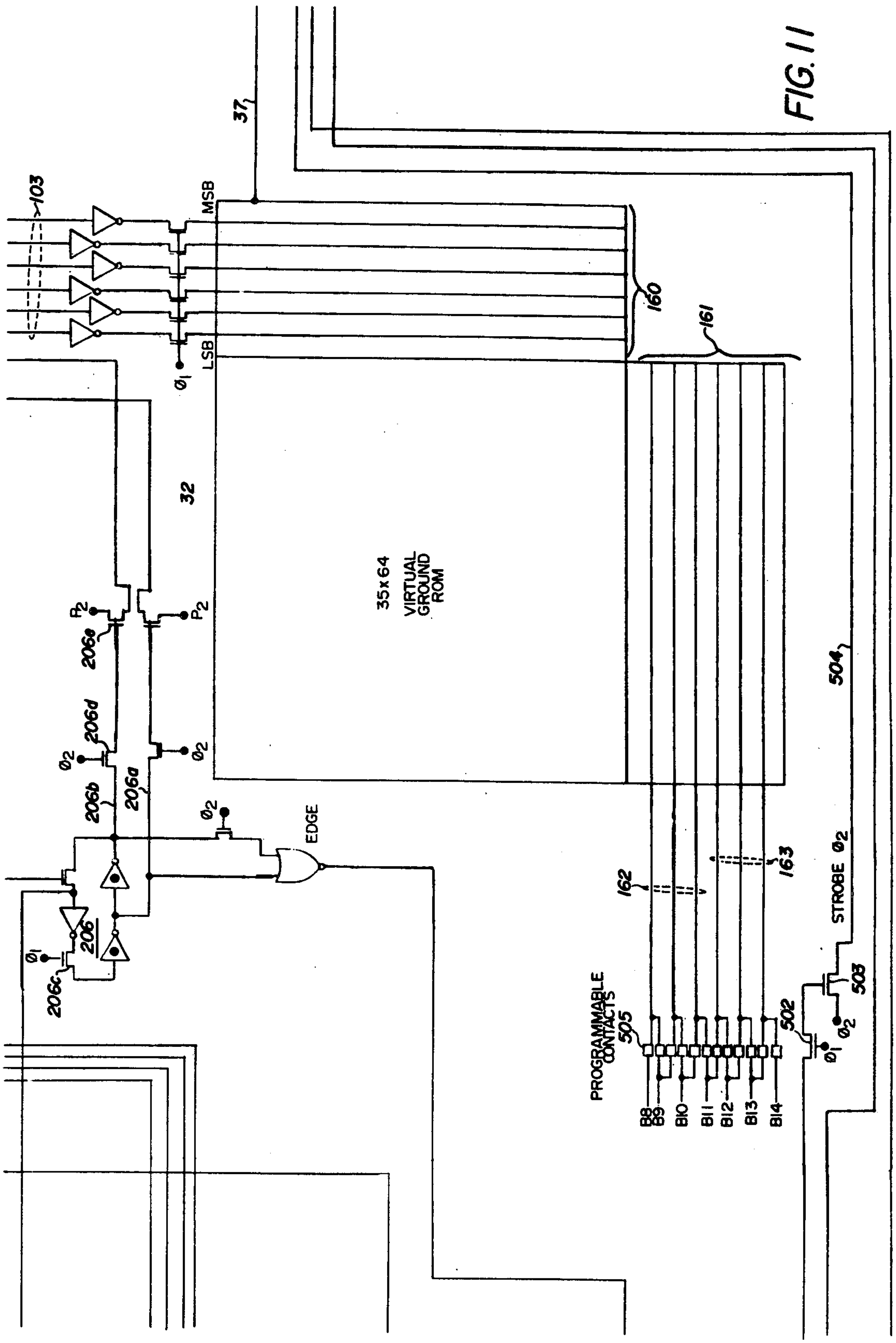
Figure 12:
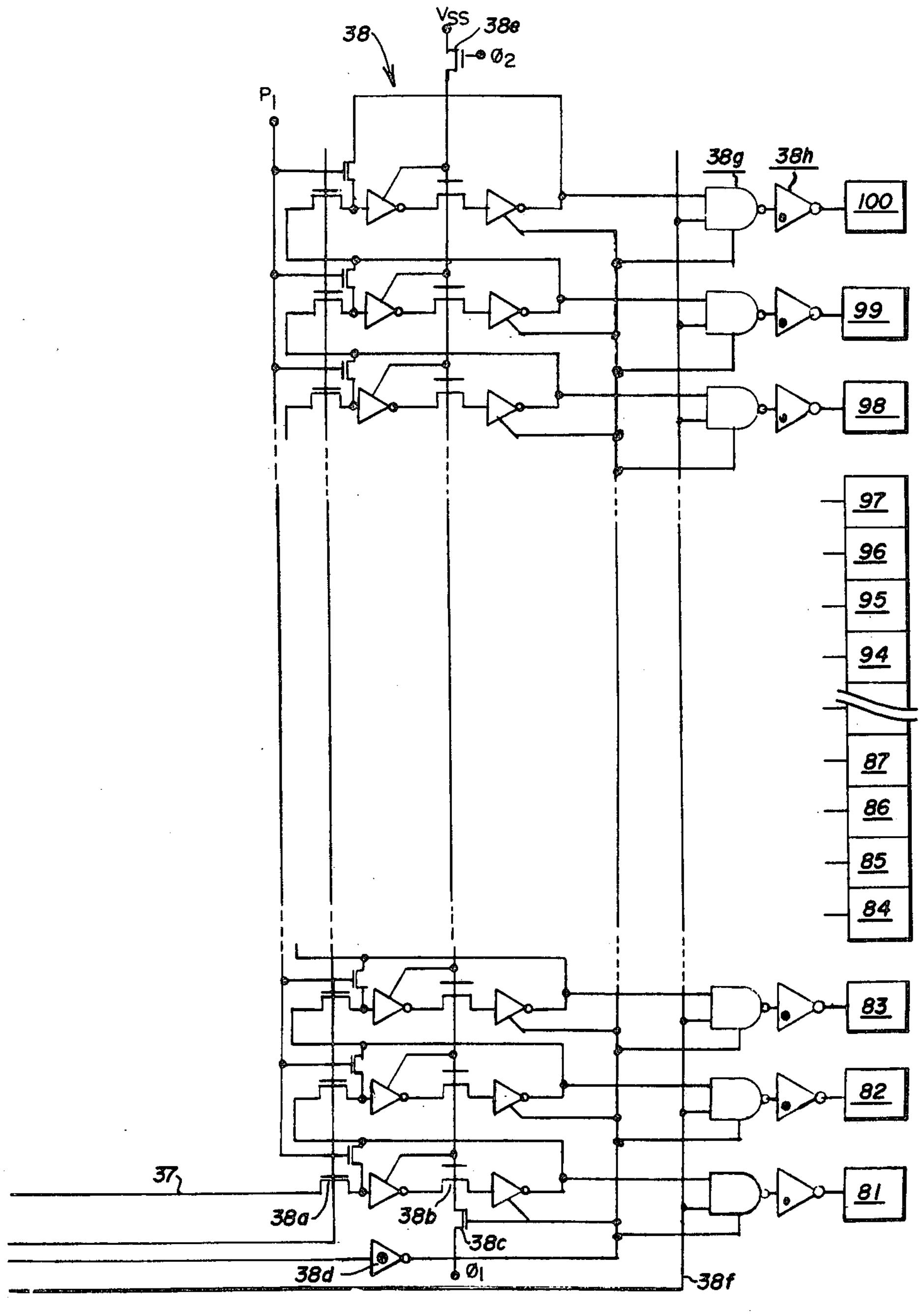

FIG. 2 is a block diagram of a large scale integrated circuit chip 18 which utilizes calculator 10 outputs and controls for the purpose of driving a segmented or dot matrix type display 21. The present example involves twenty 5 × 7 dot matrices for displaying a line of up to twenty characters.

In FIG. 2, a binary coded data stream from calculator 10 is received by way of line EXT leading to chip 18. Thirteen bit instruction words are derived from the Read-Only-Memory of calculator 10. Instruction words are received by way of line IRG. A sync signal is received by way of the IDLE line and is a signal of known time relation to timing signals in calculator 10.

The line 17 supplies to calculator 10 a signal indicating that chip 18 is busy, engaged in an assigned task not completed.

Referring to FIGS. 2 and 13, components on chip 18 operate collectively to energize light emitting diode elements formed in the display 21. The display 21 comprises an array of 700 light emitting diodes arrayed in 7 rows and 100 columns. The 100 columns are further divided into 20 groups of 5 columns each. Thus, the 700 diode array is made up of 20 matrices each having 5 columns and 7 rows of light emitting diodes and each being capable of displaying an alphanumeric character.

Each matrix is provided with a bus for each column and each row. Each diode in a matrix is connected to the column bus 26 and row bus 25 associated with its column and row position in the matrix. Lines 23*a*-23*e* connect to unique column buses 26 in each light emitting diode matrix. The driver devices 19 interconnect the light emitting diode row buses 25 with lines 22 (22*a*-22*t*) and lines 24*a*-24*g*. There are twenty driver devices 19 with inputs connected in common to the lines 24*a*-24*g* and the outputs connect to unique matrices via lines 25. The 35 light emitting diodes in each matrix are addressed sequentially and likepositioned light emitting diodes in the twenty matrices are addressed in unison. Therefore, at any given time, only one of the lines 23*a*-23*e* and only one of the lines 24*a*-24*g* may carry an addressing signal permitting energization of the associated light emitting diode in each matrix.

If it were not for the interaction of the signals carried on lines 22 (22*a*-22*e*), the above described system would cause each diode in every matrix to light sequentially. As this sequencing occurs very rapidly, each of the 35 light emitting diode matrices would appear to the human eye to be constantly energized, thus appearing as a rectangle. To convey desired information in the form of alphanumeric characters, an addressed diode in a matrix will not energize unless there is also present an enable signal on the line 22 to the driver device 19 connected to that matrix. Thus by providing an enable signal on lines 22 at only appropriate times, a string of 20 alphanumeric characters can be made to appear on the display 21. The method of generating these enable signals is discussed later. The enable signals control the driver devices 19, for instance, by controlling the availability of electrical current needed to operate the driver 19.

Referring again to FIG. 2, data stream on line EXT is supplied to a function Programmable Logic Array (PLA) 30, the output of which is stored in a storage device 31. One such storage device is a Sequentially Addressed Memory (SAM) as now well known in the art and described in detail in above referenced application Ser. No. 420,999. The provision of a decoder such as PLA 30 is a feature of this invention which allows communication of both alphanumeric character data and function signals to be supplied on the same serial input, thereby minimizing pin requirements. PLA 30 converts function signals to the format used by the character data. SAM 31 stores twenty words having 6 bits, each word representing one of the twenty characters that are to be displayed by the display 21. A Read-Only-Memory (ROM) 32 is provided to store a 35 bit code for each of 64 alphanumeric characters capable of being displayed. The 35 bits of the code corresponds with the 35 light emitting diodes in each matrix of the array. The twenty words in the SAM 31 are read out in parallel format on bus 33 into ROM 32, which is capable of converting each 6 bit word into a 35 bit code. A selected bit from each 35 bit code is read out of ROM 32 and into a storage means such as shift register 38 on line 37. The bit selected from the 20 codes is in the same bit position for all 20 codes and corresponds to the position of those light emitting diodes which will be addressed during the display cycle, a display cycle being the length of time needed to complete the decoding of 20 six bit words plus the time the light emitting diodes are subsequently energized.

After all 20 six bit words have been decoded, and the selected bit from each code has been read into the shift register 38, the shift register 38 then communicates enable codes to respective driver devices 19 for a predetermined length of time, for instance, 300 microseconds. The enable codes permit selected light emitting diodes to energize whenever called on by the 35 bit code corresponding to each displayable alphanumeric character. The process then is repeated, except the bit position now selected to be read from the ROM 32 for each of the 20 codes is different than the bit position selected during the previous display cycle and is typically the next bit in sequence.

As can be see, the system could be made to sequence through 5 columns before changing the row addressed or could be made to sequence through 7 rows before changing the column addressed. Of course, the 35 bit codes would have to be programmed in accordance with the sequencing method selected.

The sequencing operations are provided by one-out-of-five decoders 39 and one-out-of seven decoders 44 which may be, for instance, ring counters, in combination with the time generator 34. Decoder 39 interconnects with the light emitting diode column buses 26 (FIG. 13) and decoder 44 interconnects with the light emitting diode row buses 25 (FIG. 13) by way of the drivers 19 as aforementioned. The decoders 39 and 44 receive timing pulses from time generator 34 on bus 35.

This system therefore is capable of controlling 700 light emitting diodes using only 20 pins for lines 22, 7 pins for lines **24*a*–24*g* and 5 pins for lines 23*a*–23*e*. If it were required to further reduce the number of pins used by a chip 18, a single output (one pin) from a decoder, such as decoder 44, could be used to control an off-chip ring counter which would in turn control the row buses 24*a*–24*g***. The described sequencing methods are features of this invention minimizing pin requirements.

Sync timing pulses on line IDLE are applied to a state time generator 40, the output of which is applied to a MATCH logic 41. Provision of an internal timing generator synchronized by a dual function signal such as $\overline{\text{IDLE}}$ is another feature of this invention minimizing pin requirements. The timing generator 34 is also connected to MATCH logic 41, whose output is connected by line 42 to the generator 34 for synchronizing the same and for the control of the time relationship of the signals on the output buses 35 and 36. Bus 35 is connected to a decoder 44 to control line **19*a* which energizes strobe 19. Strobe 19 provides an enable signal to display 21** to effect energization of each row of the matrices in succession.

Instruction words on line IRG are applied to an instruction decoder 48. The output of decoder 48 is applied to control logic 49 which is connected to various elements throughout the system as will be shown.

A general functional description of the load display cycle is as follows. A zero display command (ZP) over IRG at the beginning of the load sequence clears the SAM 31. The characters to be displayed are loaded into the SAM 31 from left to right, i.e., the first character loaded will be the right most character in the displayed output, and the last character loaded will be the left most character in the displayed output. Each "character" is loaded by sending its proper seven bit code over EXT, six of which bits are loaded into SAM 31 upon a subsequent character display (CP) command received over IRG, and decoded in decoder 48 for activating control logic 49 accordingly. If a blank in the printed output is desired, a step display (SP) command is transmitted over IRG for actuating logic 49 effecting a six bit code to be entered into the SAM representing a blank.

If a function command is transmitted over EXT, its seven bit code is communicated to the PLA 30. A function display command (FP) transmitted on IRG actuates control logic 49 to enable a seven bit code representing the function to be decoded by the PLA 30 which generates in response thereto three six bit codes representing a three character function symbol, which will be displayed, to be loaded into SAM 31. When all twenty characters, including blanks, whether in the form of a function symbol and/or data, have been loaded into SAM 31, a display command (PP) over IRG via control logic 49 actuates timing generator 34 to begin sequencing operations. The SAM 31 provides in 6 bit parallel format the twenty words stored therein to ROM 32. ROM 32 decodes each 6 bit word into a 35 bit code representing how the 35 light emitting diodes in each of twenty matrices are to be subsequently energized to display the twenty alphanumeric characters represented by the 20 six bit words stored in SAM 31. Time generator 34, in combination with decoders 39 and 44, causes the first column and first row bit of each ROM 32 generated code to be loaded into shift register 38. When shift register 38 is loaded, enable commands are communicated to selected display drivers 19 at the same time the first row and first column positioned light emitting diodes are addressed. This process continues, all 35 like-positioned diodes being addressed in sequence, with the sequence starting over after light emitting diodes in the 35th position have been addressed.

Time generator 34 counts instruction cycles and enables the one-out-of-five decoder 39 and the one-out-of-seven decoder 44 at a sufficiently fast rate so that the eye will see a complete character, i.e., preferably 90 Hz per character line.

A sample sequence is set out in Table 1 below illustrating generation of a typical display output.

TABLE I

| Desired Output | | 1.234567890 - 45 LNX |
|---|---|---|
| | IRG | EXT |
| 1) | — | 7 bit code for LNX (  ) |
| 2) | FP | 7 bit code for LNX |
| 3) | SP | |
| 4) | SP | |
| 5) | | 7 bit code for LNX |
| 6) | CP | 7 bit code for 5 (0000110) |
| 7) | | 7 bit code for 4 |
| 8) | CP | |
| 9) | | 7 bit code for — |
| 10) | CP | |
| 11) | | 7 bit code for 0 |
| 12) | CP | |
| 13) | | 7 bit code for 9 |
| 14) | CP | |
| 15) | | 7 bit code for 8 |
| 16) | CP | |
| 17) | | 7 bit code for 7 |
| 18) | CP | |
| 19) | | 7 bit code for 6 |
| 20) | CP | |
| 21) | | 7 bit code for 5 |
| 22) | CP | |
| 23) | | 7 bit code for 4 |
| 24) | CP | |
| 25) | | 7 bit code for 3 |
| 26) | CP | |
| 27) | | 7 bit code for 2 |
| 28) | CP | |
| 29) | | 7 bit code for . |
| 30) | CP | |
| 31) | | 7 bit code for 1 |
| 32) | CP | |
| 33) | PP | |

The foregoing has been a brief description of the invention as illustrated in block diagram form. FIGS. 3–12 depict a detailed circuit of one embodiment of the invention as fully described in Ser. No. 428,492, of which application this is a continuation-in-part of a continuation-in-part except that the one-out-of-seven decoder is partially implemented on chip 18 and partially on a separate shift register chip, such as that shown in FIG. 14. U.S. Pat. No. 4,020,465 is hereby incorporated herein by reference. The drawings have been reproduced therefrom for the sake of clarity and convenience. It is, of course, understood that wherever U.S. Pat. No. 4,020,465 contemplates a printed output from chip 18, the invention according to this application contemplates a strobed display, such as, for example, replacement of the stepping motor by the aforementioned ring counter.

That is, it will be appreciated that the circuit description in FIGS. 3*a*–12 in U.S. Pat. No. 4,020,465 is readily modified to describe the output from register 38 on lines 22 for actuating a bank of VLED's arranged in a similar sequence of 5 × 7 "dots". The addressing of the VLED array via lines 22 and the one-out-of-five decode 39 is as above described. However, the output from the partially implemented one-out-of-seven decoder 44 is coupled to the aforementioned shift register as shown in FIG. 14. As will be explained, seven bit counter circulates a single bit through the seven positions for actuating each row of the seven row matrix in sequence, in a manner analogous to vertical displacement of the paper by the paper drive motor in U.S. Pat. No. 4,020,465.

Again referring to FIG. 13, there is shown a functional representation of the VLED display matrix and display drivers 19 utilized in combination with the chip 18 for displaying the alphanumeric output. It is understood that additional digit and segment drivers between the column buses 19 and lines 23*a*–23*e* may be used in driving the display, although not depicted in FIG. 13. Furthermore, it is understood that this display system is equally suitable for actuating other multisegment displays such as liquid crystal, gas discharge tubes and electrochromic displays. Twenty groups of 5 × 7 diode arrays are arranged having the respectively positioned diode in each column electrically connected in common by lines 23*a*–23*e*. That is, line 23*a* connects the first dot in the first column of each array, line 23*b* connects the second dot in each 5 × 7 group and so forth. Lines 25 electrically couple each row of each diode matrix with the like row output of the display driver 19, i.e., line B1 connects the first row of each matrix while B2 connects the second row and so forth.

Referring to FIGS. 14*a*, 14*b*, the aforementioned ring counter is a seven bit counter wherein a logic zero is shifted one bit at a time so as to effect addressing of the seven rows of the diode matrices. All B1 lines are actuated for one D time, for example, while all B2 lines are actuated during the succeeding D time, and so forth. In the above described manner it is seen that functioning of the VLED display is analogous to that described with respect to the printer in U.S. Pat. No. 4,020,465. Appropriate diodes are actuated in each row, and then the next succeeding row is actuated until the entire seven rows are scanned, with the scanning rate at a sufficiently high rate such that the eye sees a continuous scan to effect a complete alphanumeric character.

Fabrication of light emitting diode displays is now well known in the art and interconnection thereof in the manner above described is readily accomplished.

The driver devices 19 in combination with the register 38 in FIG. 2 for driving the diode matrix display is such that a moving message may be generated on the diode display. That is, by shifting the contents in the print storage SAM, FIG. 9 one digit (character) at a time, at the appropriate rate and shifting in a new data digit to be displayed. This is effected by loading the SAM with the particular sequence of character code strobing the display a number of times after addressing the ROM, and then reloading the SAM with the character codes shofted one digit. The appropriate diodes are energized accordingly creating a moving or flowing display is generated. This, of course, advantageously allows more than a 20 digit prompting command to be displayed. A typical frequency for actuating the diode matrices and shifting the register 38 is 90 Hz.

While a specific embodiment of a strobed multielement display has been described in detail, it will be apparent to those skilled in the art that various changes may be made without departing from the spirit or scope of the invention.

What is claimed is:

1. An alphanumeric display system for actuating a plurality of groups of display elements, said display elements in each one of said groups being correspondingly disposed to provide an alphanumeric representation upon actuation of selected display elements, said alphanumeric display system comprising:

(a) input means for receiving digital input data;

(b) memory means, operatively connected to said input means, for temporarily storing data received by said input means, (c) first means, operatively connected to said memory means, for permanently storing alphanumeric character display codes and for converting said data into a plurality of alphanumeric character display words corresponding to said data;

(d) second means, operatively connected to said first means, for reading out a sequentially selected bit from each of said words; and (e) third means operatively connected to said second means for actuating a selected display element in response to each said sequentially selected bit from each of said words corresponding to said data.

2. The system of claim 1 wherein each of said alphanumeric character display words has a number of bits equaling the total number of display elements disposed in one of said groups and wherein said input data is converted into an alphanumeric character word for each of said groups.

3. The system of claim 2, wherein said display elements are light emitting diodes correspondingly disposed in columns and rows in each of said groups.

4. The system of claim 2 further including a second memory means for storing a number of binary bits, said number being at least equal to the number of said groups, said second memory means storing a selected bit from each of said words, and wherein said sequencer means is operatively connected to said memory means via said second memory means.

5. The system of claim 4, wherein said memory means is responsive to said sequencer means for determining which one of the bits of each said words becomes the selected bit from each one of said words.

6. The system of claim 2, wherein said memory means reads out the selected bit from each of said words and the particular bit selected from said words is sequentially varied each time the plurality of words are converted by said memory means.

7. An alphanumeric display system for actuating a plurality of groups of display elements, said display elements in each one of said groups being correspondingly disposed to provide an alphanumeric representation upon actuation of selected display elements, said alphanumeric display system comprising:

(a) input means for receiving digital data;

(b) first storage means, operatively connected to said input means, for storing data received by said input means and for reading out said data;

(c) second storage means, operatively connected and responsive to data received from said first storage means, for storing alphanumeric character display words and for addressing the alphanumeric character display words corresponding to said data;

(d) third storage means, operatively connected to said second storage means for storing a sequentially selected bit from each addressed alphanumeric character word, each said selected bit having one of two possible logical conditions, a first logical condition for indicating that a correspondingly selected one of said display elements should be actuated in rendering the desired alphanumeric display and a second logical condition for indicating that said correspondingly selected one of said display elements should not be actuated, said third storage means storing one such bit for each of said groups;

(e) sequencer means, operatively connected to said second storage means, for repetitively and sequentially addressing selected ones of said display elements in each of said groups and for selecting a similarly positioned bit from each of said alphanumeric character words each such bit being correspondingly related to one of said groups and stored in said third storage means; and (f) actuator means, operatively connected to said third storage means and to said sequencer means for actuating selected display elements when:

(1) said sisplay elements are addressed by said sequencer means, and (2) said correspondingly related bit stored in said third storage means has a said first logical condition.

8. The displaying system of claim 7, wherein said display elements are correspondingly disposed in columns and rows in each one of said groups.

9. The display system of claim 8, wherein said input means, said first, second and third storage means and said sequencer means are implemented on a single semiconductor chip, said groups and said actuator means being controlled by said semiconductor chip utilizing a number of conductors numerically equaling the total of the number of display elements disposed in one of said rows in one of said groups, plus the number of display elements disposed in one of said columns in one of said groups, plus the number of groups.

10. A display system of claim 7 wherein said input means further comprises a decoder for determining whether said input data comprises numerical data or alphabetical function codes and for providing said second storage means with digital codes corresponding to said alphabetical function codes, which digital codes are convertible into at least one corresponding alphanumeric character code by said second storage means.

11. A display system of claim 10 further comprising means responsive to a control input for generating an enable input to the decoder for decoding the input data.

12. The display system of claim 7 wherein the first storage means comprises a sequential access memory.

13. The display system of claim 7 wherein said second storage means comprises a Read-Only-Memory.

14. The display system of claim 7 wherein said third storage means comprises a shift register.

15. The display system of claim 10 wherein said decoder comprises a programmable logic array.

16. The display system of claim 7 wherein said sequencer means comprise at least one ring counter.

17. The display system of claim 7 wherein said actuator means comprises at least one display driver device.

18. The display system of claim 8 wherein said groups of display elements comprise an array of light emitting diodes.

19. The display system of claim 7 wherein said display elements comprise gas discharge display devices disposed in at least one gas discharge display tube.

20. The display system of claim 7 wherein said sequencer means comprise at least one shift register.

21. A method of actuating a plurality of groups of display elements, said display elements being correspondingly disposed in such each of said groups to provide an alphanumeric representation in response to input data, said method comprising:

(a) permanently storing a plurality of alphanumeric character display codes;

(b) converting said input data into alphanumeric character display words corresponding to said input data and temporarily storing a sequentially selected bit from each of said alphanumeric display words; and (c) sequentially actuating selected display elements in response to said sequentially selected bit from each of said words.

22. The method according to claim 21, wherein said display elements are correspondingly disposed in rows and columns in each of said groups and wherein each of said alphanumeric character display words has a number of bits equaling the total number display elements disposed in said rows and columns of one of said groups.

23. The method according to claim 22, wherein said data is converted into an alphanumeric character word for each of said groups.

* * * * *